(No Model.)
C. H. HERSEY.
DRYING APPARATUS.
No. 263,517. Patented Aug. 29, 1882.
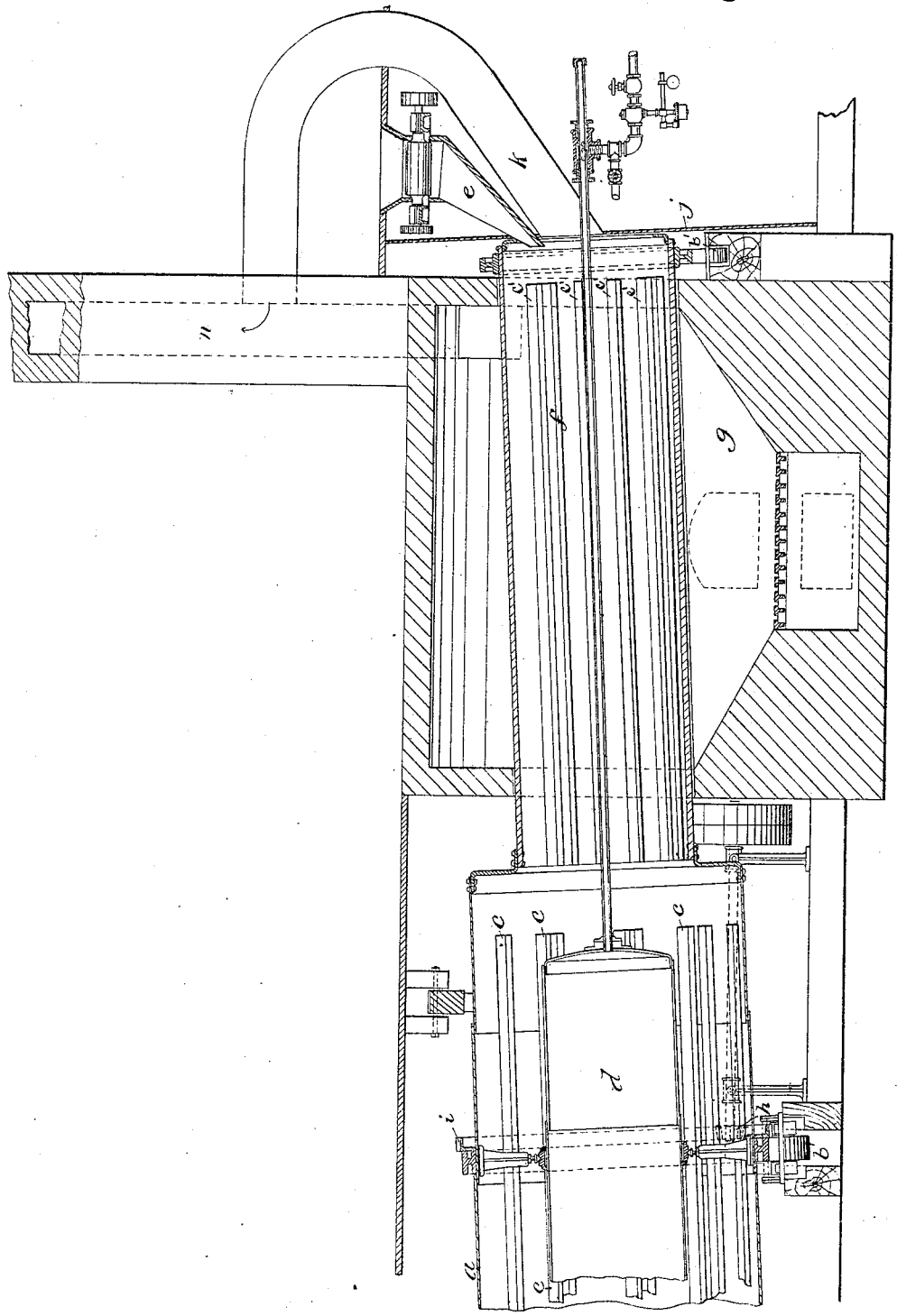
Witnesses:
Bernice J. Noyes.
John F. C. Preinkert
Inventor,
Charles H. Hersey
By Crosby Gregory Attys.

UNITED STATES PATENT OFFICE.

CHARLES H. HERSEY, OF BOSTON, MASSACHUSETTS, ASSIGNOR OF ONE-HALF TO FRANCIS C. HERSEY, OF SAME PLACE.

DRYING APPARATUS.

SPECIFICATION forming part of Letters Patent No. 263,517, dated August 29, 1882.

Application filed July 12, 1882. (No model.)

*To all whom it may concern:*

Be it known that I, CHARLES H. HERSEY, of Boston, county of Suffolk, State of Massachusetts, have invented an Improvement in Drying Apparatus, of which the following description, in connection with the accompanying drawing, is a specification.

My invention relates to driers, and has for its object to produce a drier which will economically treat matter containing large quantities of moisture.

A drier formerly invented by me, upon which Letters Patent of United States were granted April 25, 1871, to which reference may be had, consists essentially of a hollow drum having a smaller heating-cylinder within it, the said drum and cylinder being slowly rotated for the purpose of agitating the material being dried, so as to give all its parts a uniform exposure to the heat.

This apparatus is adapted to treat substances—such as sugar—containing a comparatively-small amount of moisture and liable to injury or destruction if exposed to a high temperature, and the said heating-cylinder is heated by steam passing through it.

The present invention consists essentially in the combination, with a drier operated by steam heat, and which is herein shown as substantially the same as in the said patent, of a primary or fire-heating chamber and means to agitate the material being dried therein, the said primary chamber being exposed to the direct heat of a fire, and being in the present instance shown as a continuation of the drum of the drier passing through a suitable furnace, its rotation with the said drum serving to agitate the material. The wet material is fed into the said primary chamber, in which the greater portion of its moisture is rapidly removed, the rapid liberation of moisture protecting the solid material from burning under the intense heat of the primary chamber. By the time that the material is so nearly dried as to be in danger of burning it has traversed the primary chamber and enters the steam-heated portion of the apparatus, in passing through which it is thoroughly dried by the gentle heat without injury. A current of air is caused to pass through the drum and primary chamber in the opposite direction to the material being dried, and carries with it the steam or moisture expelled from the said material, the said air and steam being conveyed by a suitable flue into the uptake of the furnace, by which the primary chamber is heated.

The drawing shows in longitudinal section a sufficient portion of a drying apparatus to illustrate this invention.

The drum $a$, mounted on rollers $b$, with its axis slightly inclined from a horizontal position, is provided with blades or buckets $c$ along its interior, and with a heating-cylinder, $d$, substantially as in my former patent referred to, these parts constituting the steam-heat drying apparatus.

Instead of delivering the material to be dried directly in the highest end of the drum $a$, as has been heretofore practiced, the said material is delivered from the chute or conducting-pipe $e$ into the primary or fire-heated chamber $f$, shown as a continuation of the drum $a$, preferably of smaller diameter than the main portion of the said drum, but having the same inclination. The said chamber $f$ extends through a furnace, $g$, of any suitable construction, so that its walls are exposed to the direct heat of the fire or heated gases. The said primary chamber $f$ is supported on rollers $b'$, similarly to the main portion of the drum $a$, and it is rotated with the said drum by the actuating mechanism consisting of a pinion, $h$, meshing with a gear, $i$, encircling the said drum, as in my former patent referred to.

The primary chamber $f$, when constructed as part of and rotating with the main drum $a$, as herein shown, will preferably be provided with blades or buckets $c'$ to agitate the material being dried as the said chamber revolves. A partition, $j$, closes the higher end of the chamber $f$.

A draft pipe or flue, $k$, is provided with a suitable air-forcing apparatus by which a current of air is drawn from the lower open end of the drum $a$ through the said drum and chamber $f$, carrying off the steam and moisture expelled from the material being dried, the said flue $k$ preferably leading into the uptake or chimney $n$ of the furnace $g$.

The herein-described apparatus is intended to act on material charged with a large amount of moisture, so that when fed in the primary chamber $f$ it will not be burned by the high temperature to which it is exposed in the said chamber, but will be quickly deprived of the larger portion of its moisture. The said chamber will be made of such length, according to the nature of the material to be operated upon, that by the time that the material has given up the larger portion of its moisture, so as to be in danger of burning, it will, in the regular feeding movement derived from the inclined position of the drum $a$ and chamber $f$, have passed from the said chamber into the drum $a$, in which it will be completely dried by the gentler heat of the cylinder $d$ without injury. By this means material can be rapidly and economically dried which is so full of moisture that it would require a very long exposure in the steam-heat drying apparatus such as heretofore used for sugar, grain, and similar material.

It is obvious that the present invention does not depend on the particular construction of the steam-heat drying apparatus, which may be of any well-known construction.

Several variations from the construction shown in the patent hereinbefore referred to may be found described in Letters Patent No. 149,397, April 7, 1874, No. 189,625, April 17, 1877, No. 245,951, August 23, 1881, any of which may be employed in connection with the primary chamber and furnace in carrying out my present invention.

In certain substances used for fertilizers it is desired to retain the largest possible amount of ammonia, which can only be done by completing the drying at a low temperature, as in the portion of the apparatus operated by steam-heat.

I claim—

1. The combination, with the steam-heat drying apparatus, of a primary chamber exposed to furnace-heat and means to agitate the material passing through the said chamber into the steam-heat drying apparatus, substantially as described.

2. The combination, with the drum and heating-cylinder therein, of the primary chamber which receives the material to be dried and conveys it to the said drum, and the furnace for heating the said chamber, substantially as described.

3. The drum and heating-cylinder therein, combined with the primary chamber connected with and forming a portion of the said drum, and means to rotate the said drum and chamber, and a furnace inclosing the latter, substantially as described.

4. The drum and heating-cylinder therein, and the primary chamber forming a portion of the said drum and provided with internal blades or buckets, combined with a furnace inclosing the said chamber, and means to rotate it and the connected drum, substantially as and for the purpose described.

In testimony whereof I have signed my name to this specification in the presence of two subscribing witnesses.

CHS. H. HERSEY.

Witnesses:
G. W. GREGORY,
JOS. P. LIVERMORE.